United States Patent
Magini et al.

(10) Patent No.: US 9,312,802 B2
(45) Date of Patent: Apr. 12, 2016

(54) METHOD FOR CONTROLLING A MULTIPHASE MACHINE

(75) Inventors: Fabio Magini, Hemmingen (DE); Paul Mehringer, Stuttgart (DE); Julian Roesner, Untergruppenbach (DE)

(73) Assignee: ROBERT BOSCH GMBH, Stuttgart (DE)

(*) Notice: Subject to any disclaimer, the term of this patent is extended or adjusted under 35 U.S.C. 154(b) by 67 days.

(21) Appl. No.: 14/131,647

(22) PCT Filed: Jul. 6, 2012

(86) PCT No.: PCT/EP2012/063222
§ 371 (c)(1),
(2), (4) Date: Apr. 4, 2014

(87) PCT Pub. No.: WO2013/007623
PCT Pub. Date: Jan. 17, 2013

(65) Prior Publication Data
US 2014/0232305 A1    Aug. 21, 2014

(30) Foreign Application Priority Data
Jul. 8, 2011  (DE) .................. 10 2011 078 842

(51) Int. Cl.
*H03K 5/00* (2006.01)
*H02P 25/22* (2006.01)
*H02P 6/08* (2006.01)
*H02P 6/10* (2006.01)

(52) U.S. Cl.
CPC ............. *H02P 25/22* (2013.01); *H02P 6/085* (2013.01); *H02P 6/10* (2013.01)

(58) Field of Classification Search
CPC ......................................... H02P 6/10
USPC ............................................ 318/400.2, 139
See application file for complete search history.

(56) References Cited

U.S. PATENT DOCUMENTS

| 6,433,518 B1 | 8/2002 | Reutlinger |
| 6,449,181 B1 | 9/2002 | Rieger et al. |
| 2011/0164443 A1 | 7/2011 | Chen et al. |

FOREIGN PATENT DOCUMENTS

| CN | 1667432 A | 9/2005 |
| CN | 101683834 | 3/2010 |
| CN | 103563233 A | 2/2014 |

(Continued)

OTHER PUBLICATIONS

International Search Report for PCT/EP2012/063222, issued on Aug. 29, 2013.

*Primary Examiner* — Erick Glass
(74) *Attorney, Agent, or Firm* — Kenyon & Kenyon LLP (57) ABSTRACT

A method is described for controlling a multiphase machine which is connected to a battery, the multiphase machine having a DC link which is provided with a DC link capacitor, phase windings, and a high side switch and a low side switch for each phase. The switches associated with the individual phases are controlled by a control unit in such a way that sinusoidal phase currents are predefined, at least one phase current is connected at any point in time in each control cycle, and a fixed, pulsed control pattern is present for each control cycle. The control widths of the actuating signals associated with the phases are constant in the pulsed control pattern. The control pulses associated with the individual phases are predefined in such a way that the DC link current which arises is minimized.

6 Claims, 12 Drawing Sheets

(56) References Cited

FOREIGN PATENT DOCUMENTS

| | | |
|---|---|---|
| DE | 19903426 | 8/2000 |
| DE | 19947476 | 4/2001 |
| DE | 10112820 A1 | 10/2002 |
| DE | 102009045489 A1 | 4/2011 |
| JP | 2003232546 A | 8/2003 |
| JP | 2005051838 | 2/2005 |
| JP | 2005051838 A | 2/2005 |
| JP | 2009232545 | 10/2009 |
| JP | 20100071970 | 6/2010 |
| JP | 20110164443 A | 8/2011 |
| WO | WO2005/034333 | 4/2005 |
| WO | 2010034793 A | 4/2010 |

…
METHOD FOR CONTROLLING A MULTIPHASE MACHINE

FIELD OF THE INVENTION

The present invention relates to a method for controlling a multiphase machine.

BACKGROUND INFORMATION

Multiphase electric drives are known in which various modulation types are used. Use of pulse width modulation (PWM) in multiphase drives is very common. Multiphase drives of this type are controlled as a function of the particular requirements that are present, according to one of the following methods:
- use of sinusoidal current control (sinusoidal commutation),
- use of block current control (block energization),
- use of block voltages (control with block voltages),
- use of sinusoidal voltage control with superimposed zero voltages.

In principle, the above-mentioned techniques may be used in electric machines having any arbitrary phase number. Electric machines having three phases are most common in practice. However, there are also electric machines having a different phase number, for example two, four, five, six, seven, or nine phases.

In addition, so-called start-stop systems are already known. These systems are used for stopping and restarting an internal combustion engine for the purpose of reducing the fuel consumption and the exhaust gas emissions.

A start-stop system developed by the present applicant operates on the basis of conventional starters. The particular starter is controlled by an electronic control unit, and with the aid of a pinion meshes with an annular gear provided on the flywheel.

Furthermore, it has previously been proposed to implement a belt-driven starter generator on the basis of a claw pole generator, using an additional electronic control unit. In starter generators of this type, the phases are often directly connected to the battery via electronic semiconductor switches without using a clock method such as PWM.

To be able to recuperate higher amounts of energy in the case of braking, systems having fairly high voltages are necessary. At higher voltages, clocking of the supply voltage in the converter is necessary for starting the internal combustion engine in order to limit the current in the machine to a predefined maximum value. A clocked converter requires a DC link to high-capacitance capacitors in order to smooth the alternating components in the intake current. In the output stages, the dimensioning of the DC links often determines the space requirements for the particular output stage.

For vehicles having voltages greater than 14 V, and 42 V, for example, use of a step-up converter is already known. It is thus possible to allow current from the generator to already be delivered before an off-load voltage of 42 V is reached.

A device and a method for controlling a generator having an associated voltage converter are known from German Published Patent Appln. No. 199 03 426 A1, the voltage converter operating as a step-up converter. The mentioned control takes place in different ways in at least two subranges which are defined as rotational speed ranges or as voltage ranges. A first, lower-level control device is used for controlling the voltage converter, which operates as a step-up converter. A second control device is used as a controller for the excitation current flowing through the excitation winding of the generator. The two control devices are connected to one another and exchange information.

The lower-level control for the step-up converter is usually achieved with the aid of centered PWM control (center-aligned control), in which the control ratio is continuously increased. This variation of the control ratio is accompanied by a high DC link current. In particular for automotive applications, the presence of a high DC link current is critical, since the DC link capacitor is subjected to high ambient temperatures, and the mentioned ambient temperatures and the DC link current determine the service life of the DC link capacitor. A reduction in the DC link current opens the possibility of using lower-capacitance DC link capacitors, resulting in cost advantages. Another advantage lies in the possibility of increasing the maximum allowed ambient temperatures due to a reduction in the internal power loss of the DC link capacitor.

SUMMARY

A method according to the present invention has the advantage that the DC link currents which arise are minimized. The method provides a control strategy in particular for electric generators in the step-up converter mode, but is also usable in the engine mode of the machine. In a method according to the present invention, a multiphase machine which is connected to a battery is controlled, the multiphase machine having a DC link which is provided with a DC link capacitor, and a high side switch and a low side switch for each phase, the switches associated with the individual phases being acted on by control signals from a control unit, and for reducing the DC link current, the control unit providing control signals for the switches associated with the individual phases in such a way that sinusoidal phase currents are predefined, at least one phase current being connected at any point in time in each control cycle, and a fixed, pulsed control pattern being present for each control cycle, the control widths of the actuating signals associated with the phases being constant in the pulsed control pattern.

DETAILED DESCRIPTION

The present invention relates to a method for controlling a multiphase machine which is connected to a battery, the multiphase machine having a DC link which is provided with a DC link capacitor, and a high side switch and a low side switch for each phase, the switches associated with the individual phases being acted on by control signals from a control unit. This method is not limited to a specific phase number of the machine, but is explained in greater detail below with reference to a five-phase machine.

Figure 1:
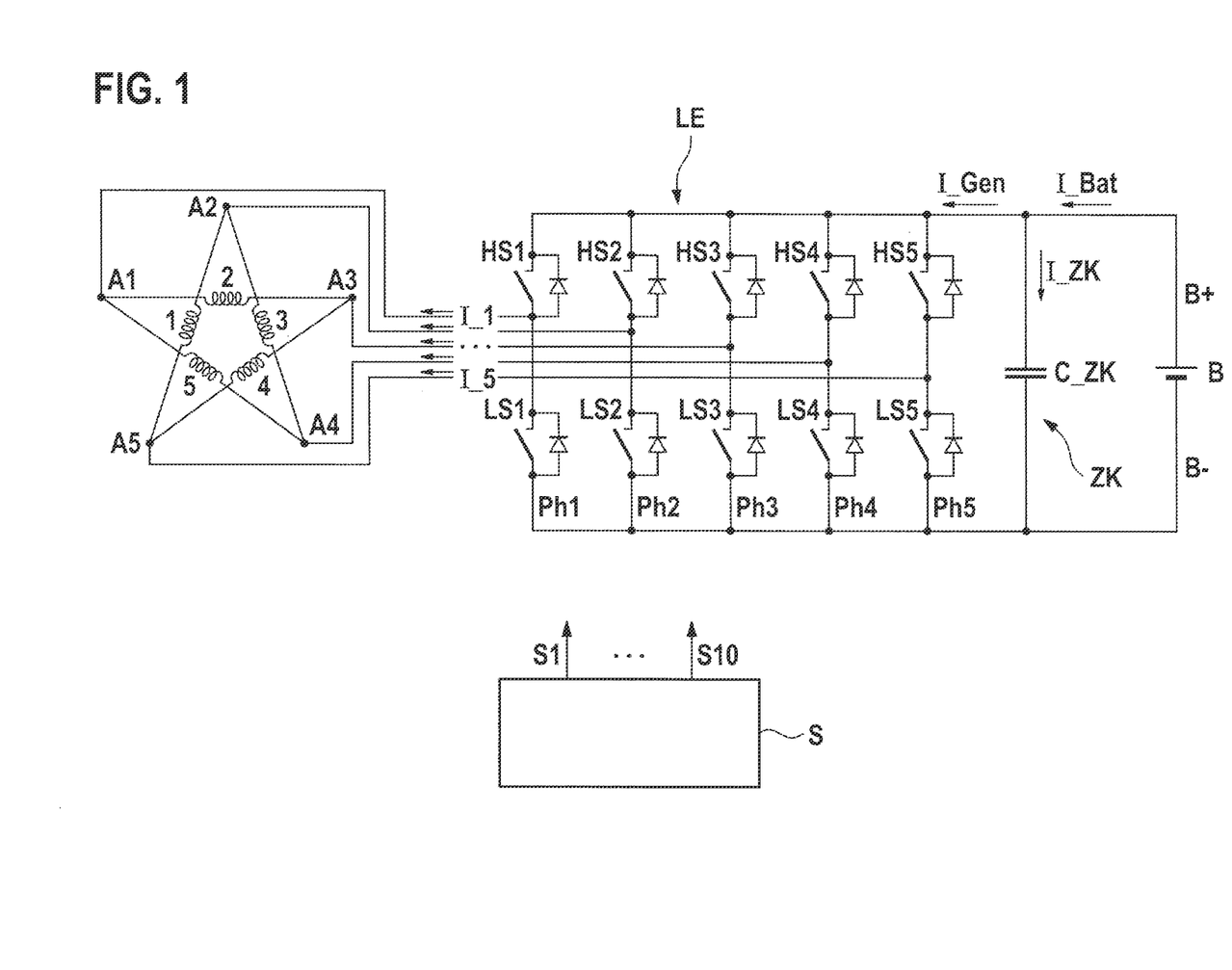
FIG. 1 shows a diagram for explaining a five-phase machine connected to a battery in a pentagram circuit having a B10 bridge.

FIG. 1 shows a diagram for explaining a five-phase machine in a pentagram circuit having a B10 bridge. A pentagram circuit is understood to mean a type of circuit in which the total of five phase windings of the circuit is electrically connected to one another in such a way that the shape of the circuit diagram is a pentagram.

The machine shown has a total of five phase terminals A1, A2, A3, A4, A5 and a total of five phase windings 1, 2, 3, 4, 5, each of these phase windings being connected between two of the mentioned phase terminals. In addition, the machine shown has a power electronics system LE which is connected to the phase terminals, and a battery B. Battery B has a positive pole B+ and a negative pole B−. A DC link ZK which contains a DC link capacitor C_ZK is situated between battery B and power electronics system LE.

Power electronics system LE contains five branches Ph1, Ph2, Ph3, Ph4, and Ph5, each of which has two switches connected in series, a diode being connected antiparallel to each of these switches. This configuration results when conventional field effect transistors are used as switches, since they contain an inverse diode. However, the use of other circuit elements, for example IGBTs, is also possible in principle.

Branch Ph1 of power electronics system LE, which contains switches HS1 and LS1, is connected to phase terminal A1 of the stator of the machine at a connecting point between the two switches HS1 and LS1. Switch HS1 of branch Ph1 is a high side switch. A diode is connected antiparallel to switch HS1. Switch LS1 of branch Ph1 is a low side switch. A diode is connected antiparallel to switch LS1. Switches HS1 and LS1 are controlled by control unit S via control signals S1 and S2.

Branch Ph2 of power electronics system LE, which contains switches HS2 and LS2, is connected to phase terminal A2 of the stator of the machine at a connecting point between the two switches HS2 and LS2. Switch HS2 of branch Ph2 is a high side switch. A diode is connected antiparallel to switch HS2. Switch LS2 of branch Ph2 is a low side switch. A diode is connected antiparallel to switch LS2. Switches HS2 and LS2 are controlled by control unit S via control signals S3 and S4.

Branch Ph3 of power electronics system LE, which contains switches HS3 and LS3, is connected to phase terminal A3 of the stator of the machine at a connecting point between the two switches HS3 and LS3. Switch HS3 of branch Ph3 is a high side switch. A diode is connected antiparallel to switch HS3. Switch LS3 of branch Ph3 is a low side switch. A diode is connected antiparallel to switch LS3. Switches HS3 and LS3 are controlled by control unit S via control signals S5 and S6.

Branch Ph4 of power electronics system LE, which contains switches HS4 and LS4, is connected to phase terminal A4 of the stator of the machine at a connecting point between switches HS4 and LS4. Switch HS4 of branch Ph4 is a high side switch. A diode is connected antiparallel to switch HS4. Switch LS4 of branch Ph4 is a low side switch. A diode is connected antiparallel to switch LS4. Switches HS4 and LS4 are controlled by control unit S via control signals S7 and S8.

Branch Ph5 of power electronics system LE, which contains switches HS5 and LS5, is connected to phase terminal A5 of the stator of the machine at a connecting point between the two switches HS5 and LS5. Switch HS5 of branch Ph5 is a high side switch. A diode is connected antiparallel to switch HS5. Switch LS5 of branch Ph5 is a low side switch. A diode is connected antiparallel to switch LS5. Switches HS5 and LS5 are controlled by control unit S via control signals S9 and S10.

During operation of the machine shown in FIG. 1, the following relationship applies for any arbitrary point in time:

$$I\_ZK = I\_Bat - I\_Gen.$$

This results in generator current I_Gen as a function of the position of the switches of the power electronics system based on a superimposition of phase currents I_1 through I_5 for the phases whose high side switch is switched on at the particular point in time.

A so-called center-aligned control is already known, in which the time period for the current flow is concentrated in a small time range. A control pattern for this type of center-aligned control and the currents which arise are illustrated in the diagrams shown in FIG. 2, the control pulses for the switches associated with the phases being denoted by reference characters U, V, W, X, and Y, and the phase currents being denoted by reference characters I_U, I_V, I_W, I_X, and I_Y in FIG. 2.

Figure 2:
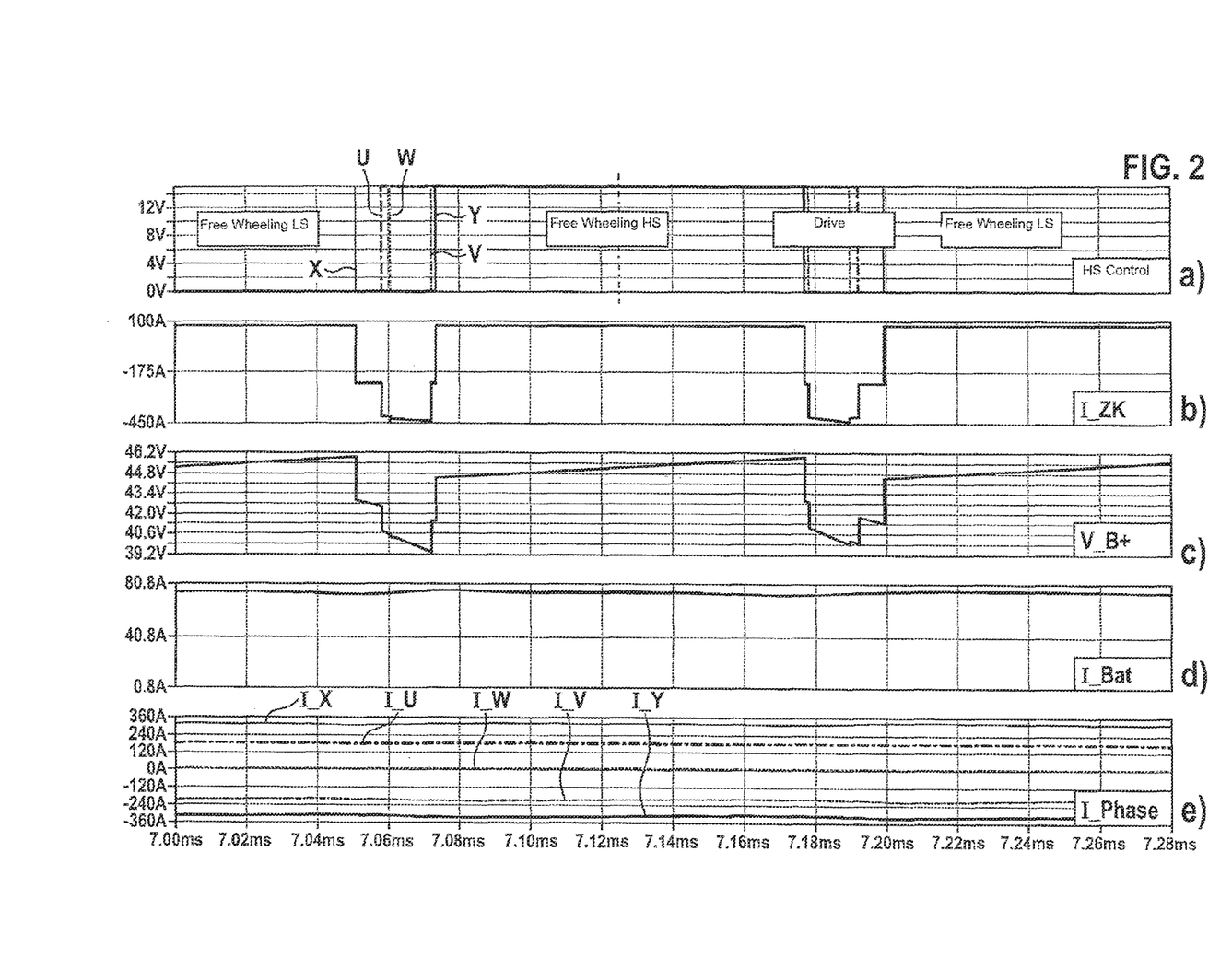
FIG. 2 shows diagrams for illustrating a known center-aligned control pattern and currents which arise.

FIG. 2a illustrates the actuating signals for the switches, FIG. 2b illustrates DC link current I_ZK, FIG. 2c illustrates voltage V_B+ present at the positive pole of the battery, FIG. 2d illustrates battery current I_Bat, and FIG. 2e illustrates phase currents I_X through I_Y.

It is apparent in particular from FIG. 2a that during center-aligned control, the pulse centers of the control pulses match with respect to time, as indicated by a vertical dashed-dotted line in FIG. 2a. It is also apparent from FIG. 2a that the edges of the control pulses differ from one another with respect to time, and are present in a limited time range. The text "free-wheeling LS" indicates that all low side switches are switched on during this time interval. The text "free-wheeling HS" indicates that all high side switches are switched on during this time interval. The text "drive" indicates that during this narrow time window the electric machine is connected to the external voltage via the switch positions. This causes a change in current in the stator windings. If a control pulse is present at the voltage level of 16 V, the particular associated high side switch is switched on. If a control pulse is present at a voltage level of 0 V, the particular associated low side switch is switched on.

It is apparent from FIG. 2b that DC link current I_ZK is subjected to intense changes in the time range of the edges of the control pulses, as also illustrated in greater detail with reference to FIG. 3.

It is apparent from FIG. 2c that battery voltage V_B+ is also subjected to intense changes in the time range of the edges of the control pulses.

FIG. 2d shows battery current I_Bat, and FIG. 2e shows phase currents I_X through I_Y, which do or do not make a contribution to the DC link current, depending on the position of the particular associated high side switch.

Figure 3:
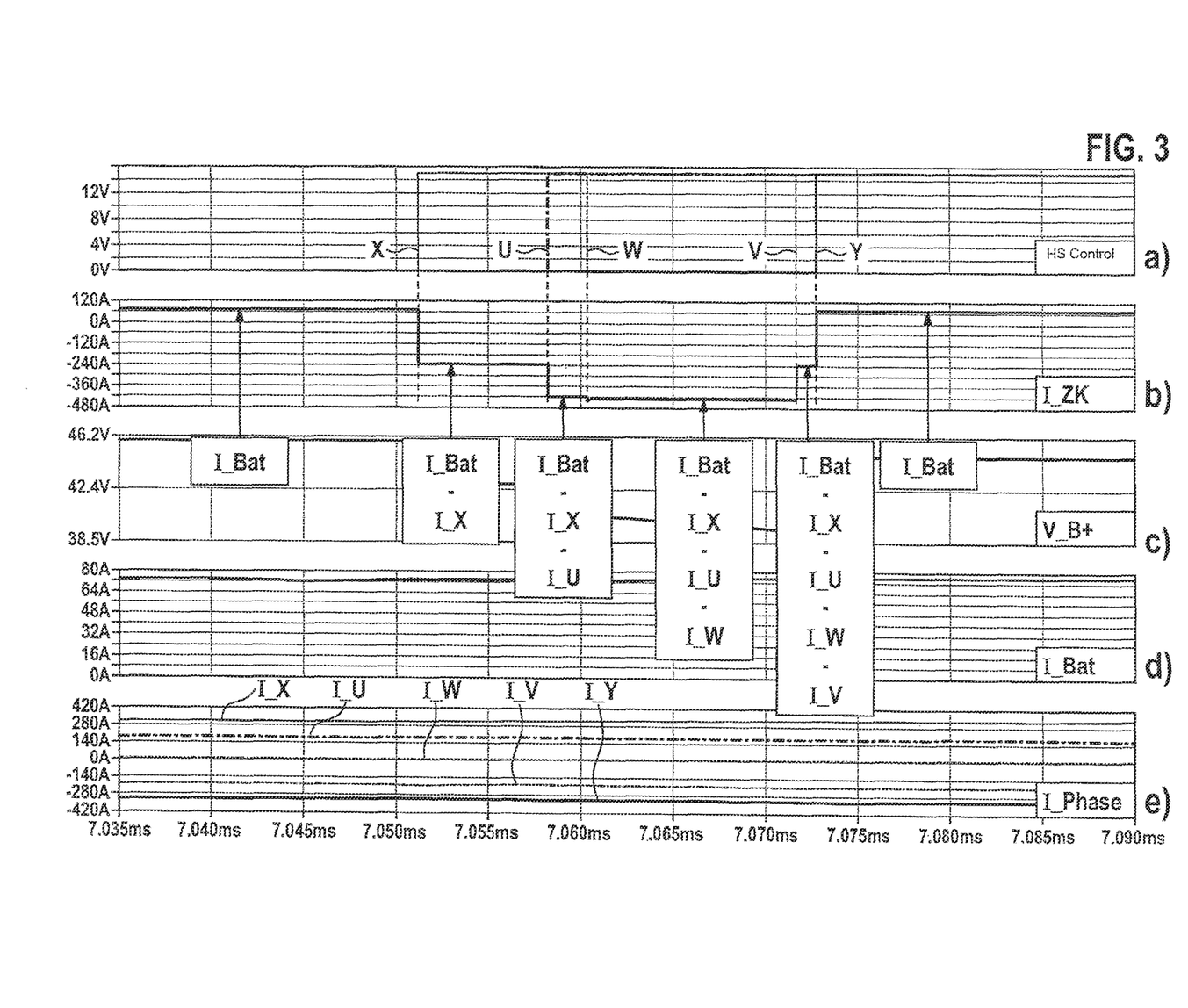
FIG. 3 shows an enlarged detail from the diagrams shown in FIG. 2.

FIG. 3 shows an enlarged detail of the diagrams shown in FIG. 2. FIG. 3a once again illustrates the actuating signals for the switches, FIG. 3b illustrates DC link current I_ZK, FIG. 3c illustrates voltage V_B+ present at the positive pole of the battery, FIG. 3d illustrates battery current I_Bat, and FIG. 3e illustrates phase currents I_X through I_Y.

It is apparent from FIG. 3b that DC link current I_ZK is formed by a superimposition of battery current I_Bat on the particular active phase current(s), and that in the case that the high side switches associated with phase terminals X, U, and W are switched on, a high DC link current flows, which in the present example is approximately 420 A, while the battery current is approximately 80 A and the effective phase current is approximately 200 A.

It emerges from FIGS. 2 and 3 that current steps, which correlate with the individual switching events with respect to time, occur in the DC link when the known center-aligned control is used. During the free-wheeling times indicated in FIG. 2, i.e., when all high side switches and low side switches are closed, I_Gen=0. Consequently, the following applies for the DC link current: I_ZK=I_Bat. In this phase the DC link capacitor is recharged. The currents are summed in the control phase.

The effective current is crucial for the consideration of power loss for the DC link capacitor.

The following relationship applies:

$$X = \left(\frac{1}{T} \cdot \int_0^T x(t)^2 \cdot dt\right)^{1/2}.$$

The arithmetic mean of the capacitor current is zero when inherent losses are ignored. The effective value increases sharply when the currents are totally added, i.e., when the current flow "tapers." The thermal stress on the DC link capacitor is high due to this sharp rise in the effective value. Such high thermal stress, which occurs when center-aligned control is used, is avoided in a method according to the present invention.

In DE 10 2011 076 676 by the present applicant (not pre-published), it has previously been proposed to expand the width of the current distribution via a new control pattern, thus reducing the effective value of the DC link current and the thermal stress on the DC link capacitor.

Figure 4:
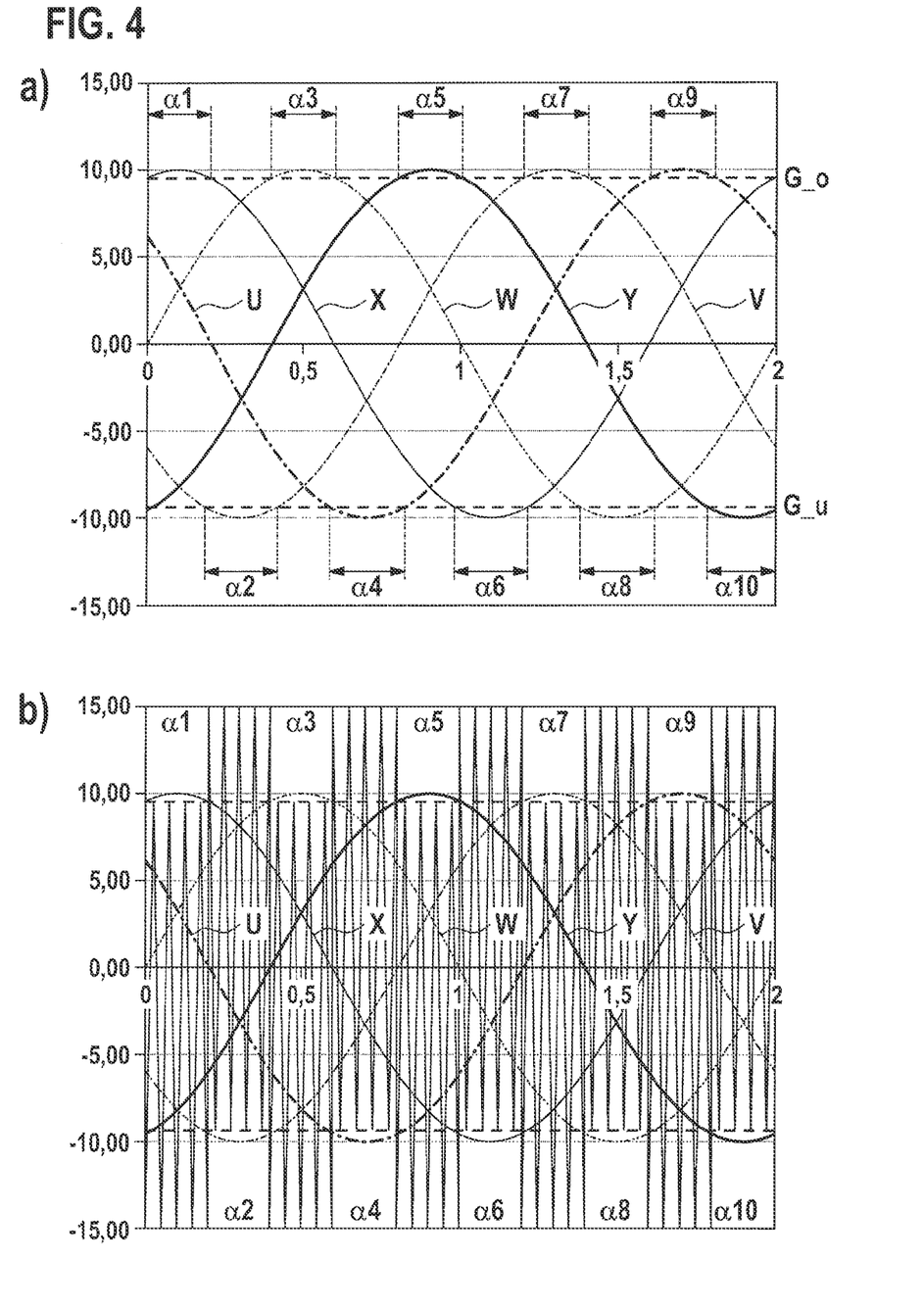
FIG. 4 shows diagrams for illustrating a five-phase sinusoidal system.

FIG. 4a shows a diagram for illustrating a five-phase sinusoidal system as used in DE 10 2011 076 676, in this diagram the phase sequence being different from that in the diagrams shown in FIGS. 2 and 3. The angle in units of it is plotted along the abscissa, and the setpoint voltage inputs are plotted along the ordinate. The associated phase currents are denoted by reference characters U, V, W, X, and Y. An upper limiting value is denoted by reference character G_o, and a lower limiting value is denoted by reference character G_u. These limiting values are illustrated in dashed-dotted lines in FIG. 4a. Upper limiting value G_o is slightly less than the maximum positive setpoint voltage value. The other limiting value G_u is slightly greater than the minimum negative setpoint voltage value.

The mentioned limiting values are ascertained as follows:

$$G\_o = U\_setpoint\_amplitude * \cos(360°/(4*PZ))$$

$$G\_u = -G\_o,$$

where PZ is the phase number of the machine.

According to DE 10 2011 076 676, the control unit provides pulsed control signals for the switches in successive control cycles, the pulse widths and pulse starts of the control signals being varied in each case within a control cycle in such a way that the DC link current is reduced.

This takes place according to the flat top process, for example. In this process, certain switches are switched on in succession, as explained below.

FIG. 4a shows angular intervals or flat top windows α1, ..., α10 in which voltage inputs exist in the sense that either the setpoint voltage value associated with a current phase is greater than upper limiting value G_o or is less than lower limiting value G_u. If the setpoint voltage value associated with a current phase is greater than upper limiting value G_o, the associated high side switch is switched on in the associated angular interval. However, if the setpoint voltage value associated with a current phase is less than lower limiting value G_u, the associated low side switch is switched on in the associated angular interval, as explained below with reference to FIG. 4b.

This figure illustrates generation of control patterns for sinusoidally commutated electric machines, using a sine-triangle comparison. By applying an offset factor, which in each case is switched over at the point in time of a flat top window switchover, to the triangle function, this automatically results in switching-on of the ten participating switches in rotation. The sinusoidal signals correspond to the setpoint voltage inputs.

It is apparent from FIGS. 4a and 4b that in angular interval α1 the high side switch of phase X is switched on, in angular interval α2 the low side switch of phase V is switched on, in angular interval α3 the high side switch of phase W is switched on, in angular interval α4 the low side switch of phase U is switched on, in angular interval α5 the high side switch of phase Y is switched on, in angular interval α6 the low side switch of phase X is switched on, in angular interval α7 the high side switch of phase V is switched on, in angular interval α8 the low side switch of phase W is switched on, in angular interval α9 the high side switch of phase U is switched on, and in angular interval α10 the low side switch of phase Y is switched on.

During a phase shift of current and voltage, it may be meaningful to shift angular intervals α1 through α10 to the right or the left, in the present case a maximum shift of 18°, in general 360°/(4*phase number), being possible.

In each of these angular intervals, apart from the phase current which is associated with the particular switch that is switched on, all other phase currents are used for reducing the DC link current. This takes place in that the control unit, using a suitable control pattern, shifts the mentioned further phase currents relative to one another in such a way that the resulting DC link current is reduced. This may be achieved by shifting the mentioned further phase currents in such a way that overlaps of positive phase currents are reduced, and/or by shifting the mentioned further phase currents in such a way that positive and negative phase currents at least partially compensate for one another.

Figure 5:
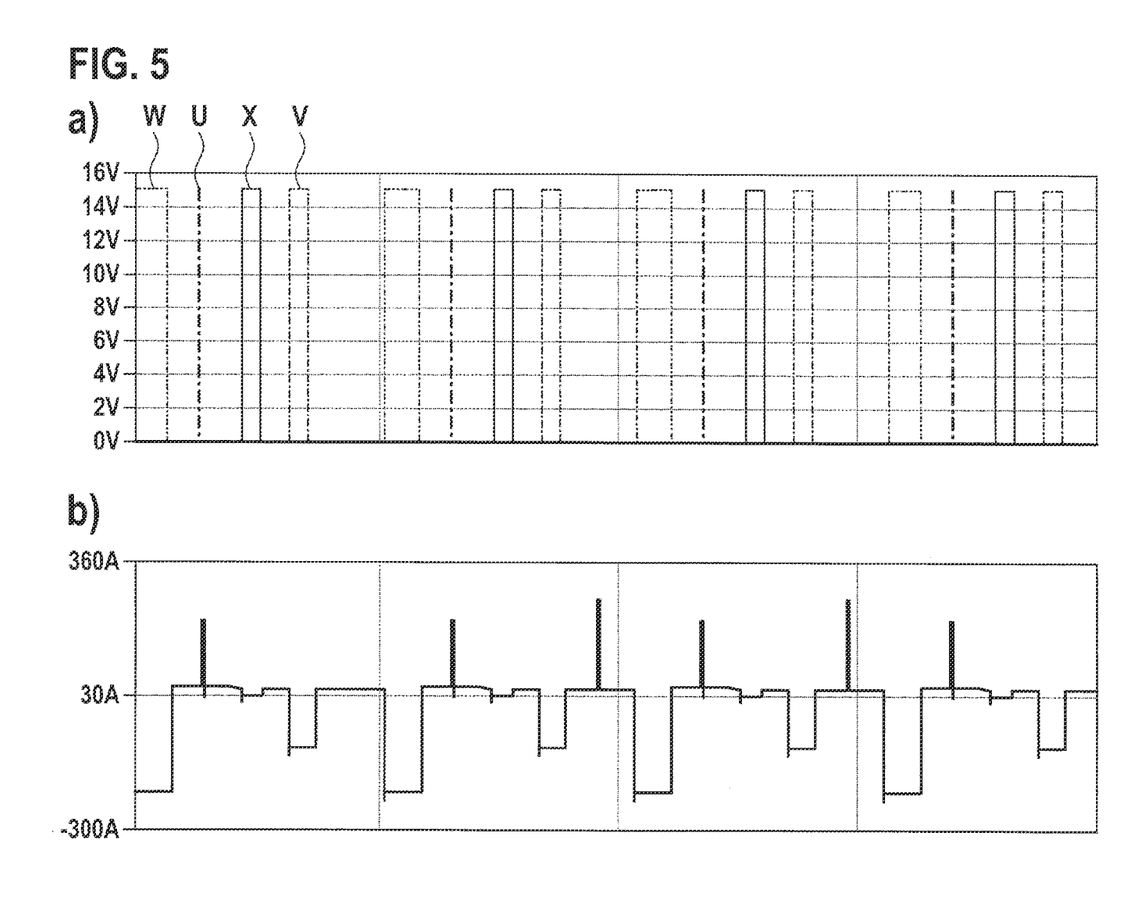
FIG. 5 shows diagrams for illustrating a first improved control pattern and the DC link current which arises.

FIG. 5 shows diagrams for illustrating a control pattern according to the invention described in DE 10 2011 076 676 and the DC link current which arises. FIG. 5a shows the control pattern, and FIG. 5b shows the DC link current which arises. It is apparent from FIG. 5a that the control pulses associated with the phases for the particular associated switches are separate from one another with respect to time, i.e., are not superimposed on one another. It is apparent from FIG. 5b that with each switching operation according to FIG. 5a, a corresponding compensating current flows in the DC link. The absolute values of the DC link current are approximately 30% lower, and therefore greatly reduced, compared to the DC link current shown in FIG. 2b. This reduction is due to the fact that intense exaggeration of the DC link current due to systematic superimposition of the phase currents no longer occurs.

In a further optimization step, the current peaks of the DC link current shown in FIG. 5b extending in the positive direction may also be eliminated. For purposes of this further reduction in the DC link current, an attempt is made to bring about a state in which the DC link current is always in the range close to its zero line. Current components, which cause an addition to the battery current, are particularly objectionable in this regard.

This undesired superimposition of phase currents is avoided by suitably shifting the associated control pulses within a control period. This shift may take place within a control period in any arbitrary manner without limiting the effect of sinusoidal commutation. As a result, the effective DC link current may once again be reduced when the control of the phases whose two switches are not switched on in the flat top window at that moment are shifted relative to one another in such a way that overlaps of positive or also negative phase currents are avoided, and/or that positive and negative phase currents are at least partially mutually compensated for.

Figure 6:
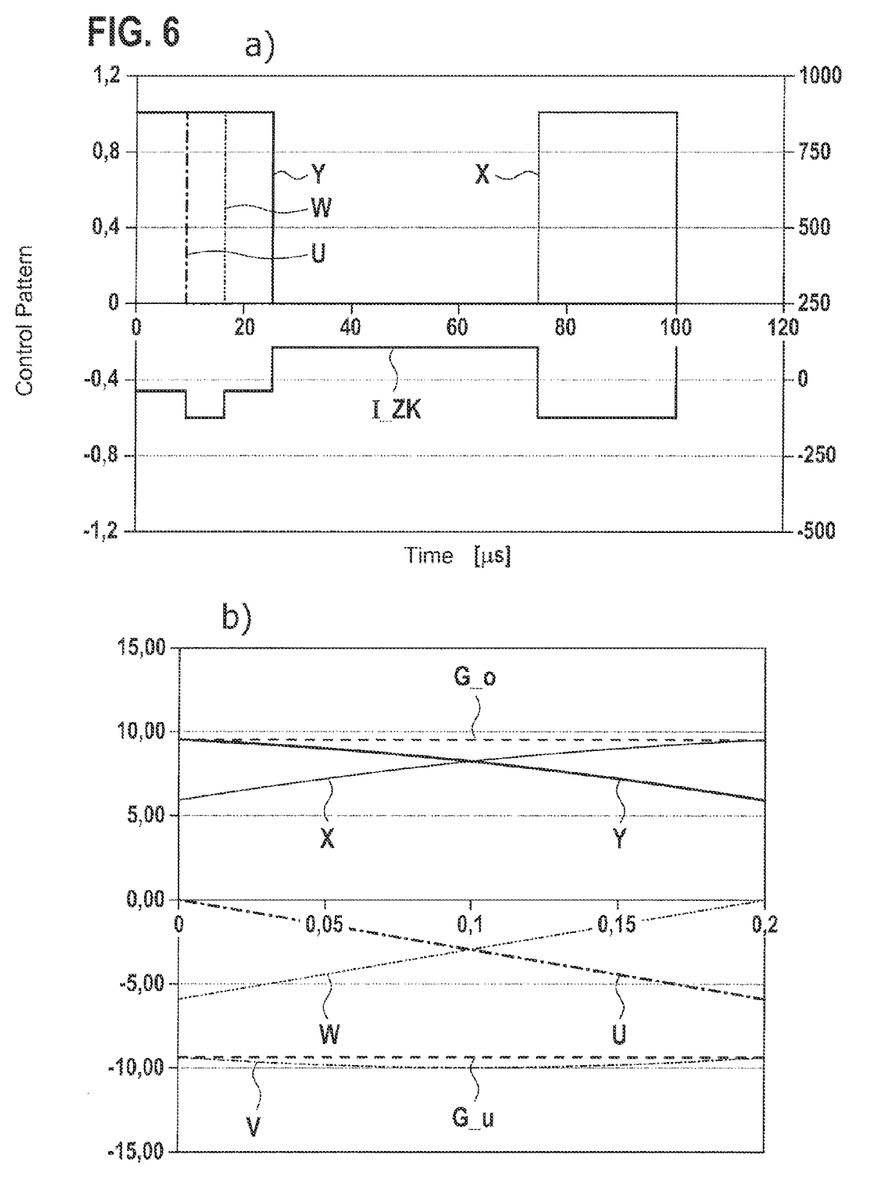
FIG. 6 shows diagrams for illustrating a second improved control pattern and the DC link current which arises.

FIG. 6 shows diagrams for illustrating a control pattern according to the above-described refinement, according to which superimposition of positive and negative phase currents takes place in such a way that the DC link current is reduced, and illustrating the DC link current which occurs and associated current values at that moment. The control pattern and the DC link current are shown in FIG. 6a, and the associated current values at that moment are shown in FIG. 6b.

With the aid of the above-described control patterns, which are the subject matter of DE 10 2011 076 676, the DC link current may be reduced by up to 40% compared to conventional center-aligned control. Sinusoidal setpoint current inputs and setpoint voltage inputs are used in this case.

According to the present invention, the aim is to achieve a further reduction in the DC link current. For this purpose, in the latter-described system the control duration or the battery current is varied, so that the pulses of the pulse pattern are moved toward one another until, in the example described above, in the ideal case the control pulses for phases X and Y are exactly flush with one another. The resulting pulse pattern and the associated DC link current are illustrated in FIG. 7, which shows a pulse pattern according to a first exemplary embodiment of the present invention.

Figure 7:
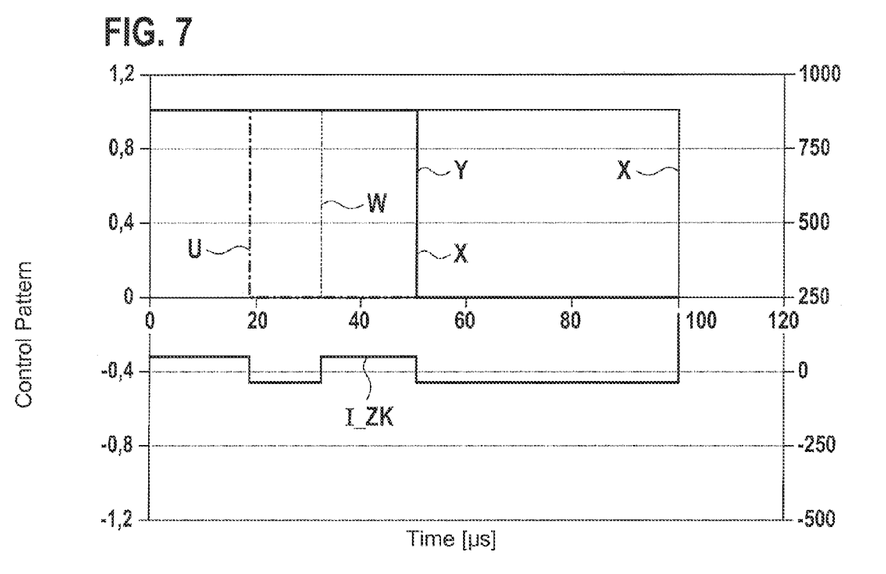
FIG. 7 shows a control pattern according to a first exemplary embodiment of the present invention.

It is apparent from a comparison of FIGS. 6 and 7 that in the case of control according to FIG. 6, for the same phase current an effective DC link current of approximately 100 A arises, while in the case of control according to FIG. 7, an effective DC link current of approximately 40 A arises. Since the pulse pattern still ensures free-wheeling phases, it is possible, for example, to operate the step-up converter with a minimum DC link current.

The following two degrees of freedom are present for generating a pulse pattern:
the starting point of a particular control pulse and
the offset of the control durations; i.e., the control pulses always result in the same current effect as long as the time difference of the individual pulses is held constant.

The pulse pattern according to FIG. 7 is characterized in that the control pulses for phases U and W are situated "beneath" the control pulse for phase Y, and that the control pulse for phase X is exactly flush with the control pulse for phase Y. Phase V is continuously switched on. After 18 angular degrees in each case, the pulse configuration is changed. In the present example, after 18 angular degrees the control pulses for phases U and W are situated "beneath" the control pulse for phase X. A switchover is subsequently made to a low side flat top having a corresponding change in the control pulses similar to that in FIG. 7.

Consequently, during operation of the machine a momentary pulse pattern is held constant for a time period corresponding to 18 angular degrees. For a five-phase system, the pulse pattern according to FIG. 7 results in current conditions in which the following relationship applies:

$$I\_eff,phase \approx I\_Bat.$$

Figure 8:
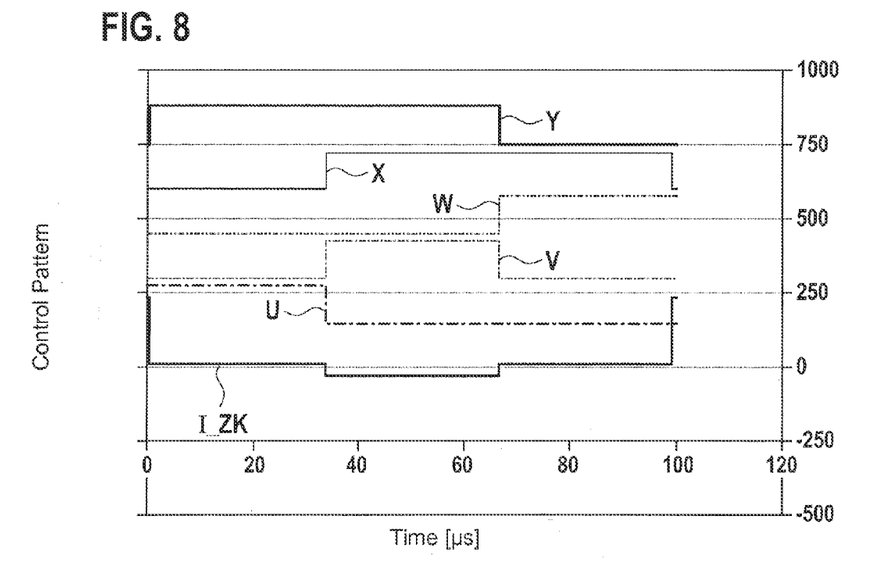
FIG. 8 shows a control pattern according to a second exemplary embodiment of the present invention.

As a second exemplary embodiment of the present invention, FIG. 8 shows an alternative control pattern which likewise results in a reduction in the DC link current. In contrast to the pulse pattern according to FIG. 7, in this case the effective phase current and battery current are in an approximate ratio of 3:4. A pulse pattern of this type may advantageously be used when lower battery currents are required in a step-up converter operation. A flat top method is not used in this second exemplary embodiment, since in this case all five phases are connected within a control cycle. In this case, the control window for phase V is situated exactly on the edges of the control pulses for phase X and phase Y.

Figure 9:
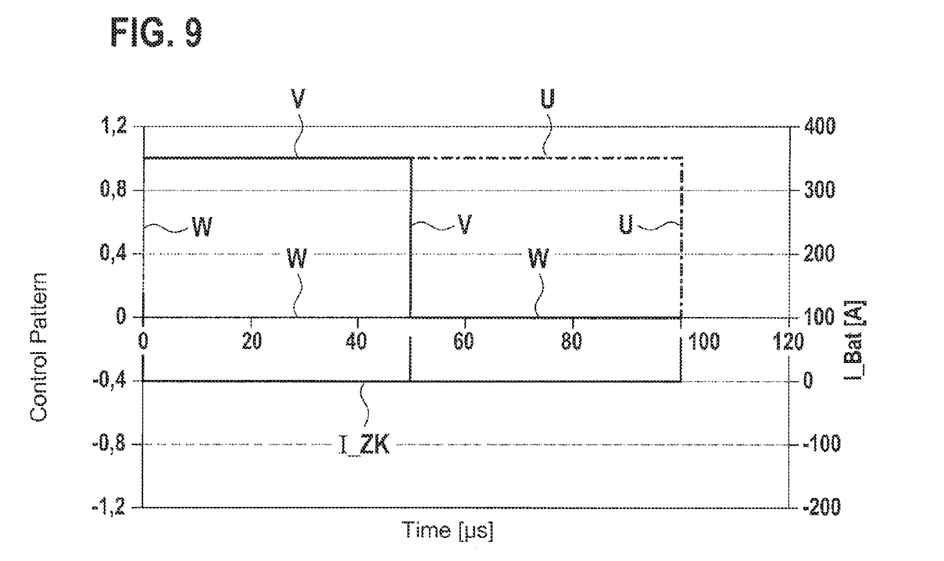
FIG. 9 shows a control pattern according to a third exemplary embodiment of the present invention.

As a third exemplary embodiment of the present invention, FIG. 9 shows a control pattern for a three-phase machine in which the resulting DC link current is reduced. This control pattern as well is characterized in that no time gaps occur within a control cycle; i.e., a phase current is always switched on within each control cycle, the sum of the predefined sinusoidal phase currents is equal to the battery current, and a fixed, unchanged control pattern is used for the duration of a control cycle.

Figure 10:
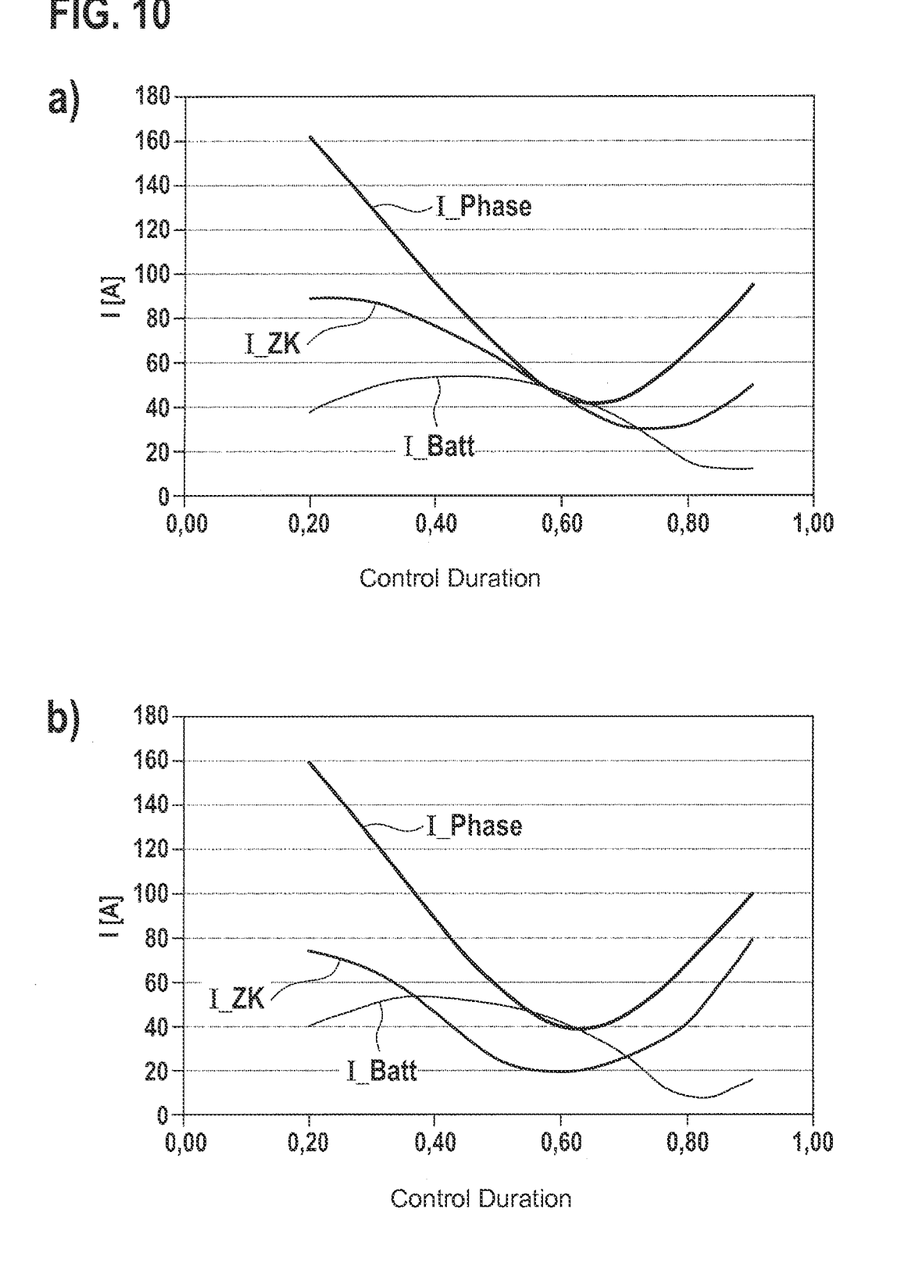
FIG. 10 shows diagrams illustrating the curves of the DC link current, battery current, and phase current as a function of the control duration.

FIG. 10 shows diagrams in which the curves of the DC link current, battery current, and phase current as a function of the control duration are illustrated. FIG. 10a shows the mentioned currents which arise in the case of a known center-aligned control, and FIG. 10b shows the mentioned currents which are present in the case of a control pattern according to FIG. 7. It is apparent that in both cases, the level of the DC link current is a function of the control width. It is apparent from FIG. 10b that a minimum DC link current is present for a control duration of 0.6, and that in this case, in comparison to center-aligned control, one-half of the DC link current may be achieved.

Figure 11:
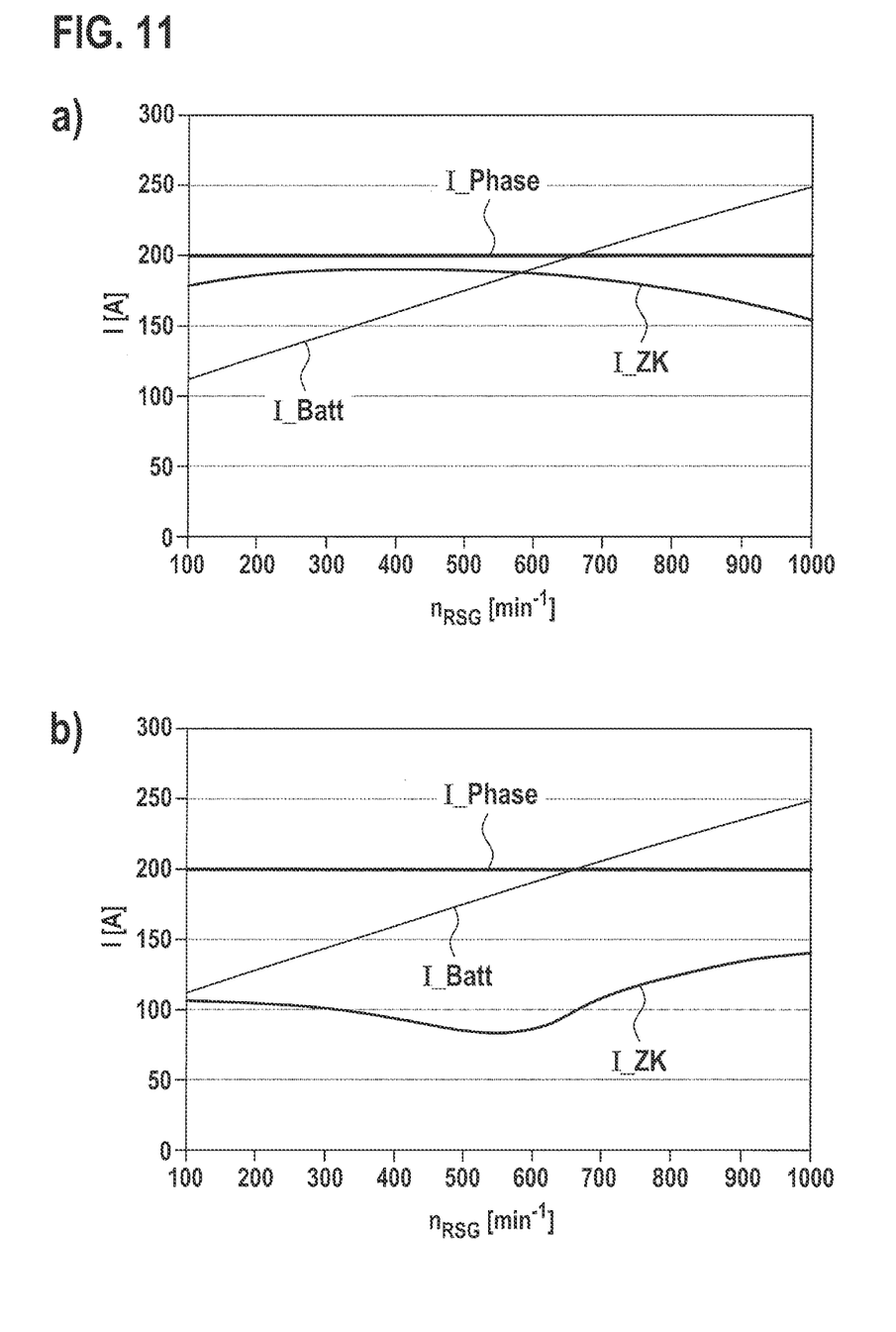
FIG. 11 shows diagrams illustrating the curves of the DC link current, battery current, and phase current as a function of the generator rotational speed.

FIG. 11 shows diagrams in which in the case of an engine start, the curves of the DC link current, battery current, and phase current are plotted as a function of generator rotational speed $n_{RSG}$. FIG. 11a shows the mentioned currents which arise in the case of known center-aligned control, and FIG. 11b shows the mentioned currents which are present in the case of a control pattern according to FIG. 7. In this case, the control width of the phase current is set to a constant value for the duration of the entire starting operation by appropriate control or regulation. It is also apparent from these diagrams that the DC link current is greatly reduced when control according to the present invention is used.

Figure 12:
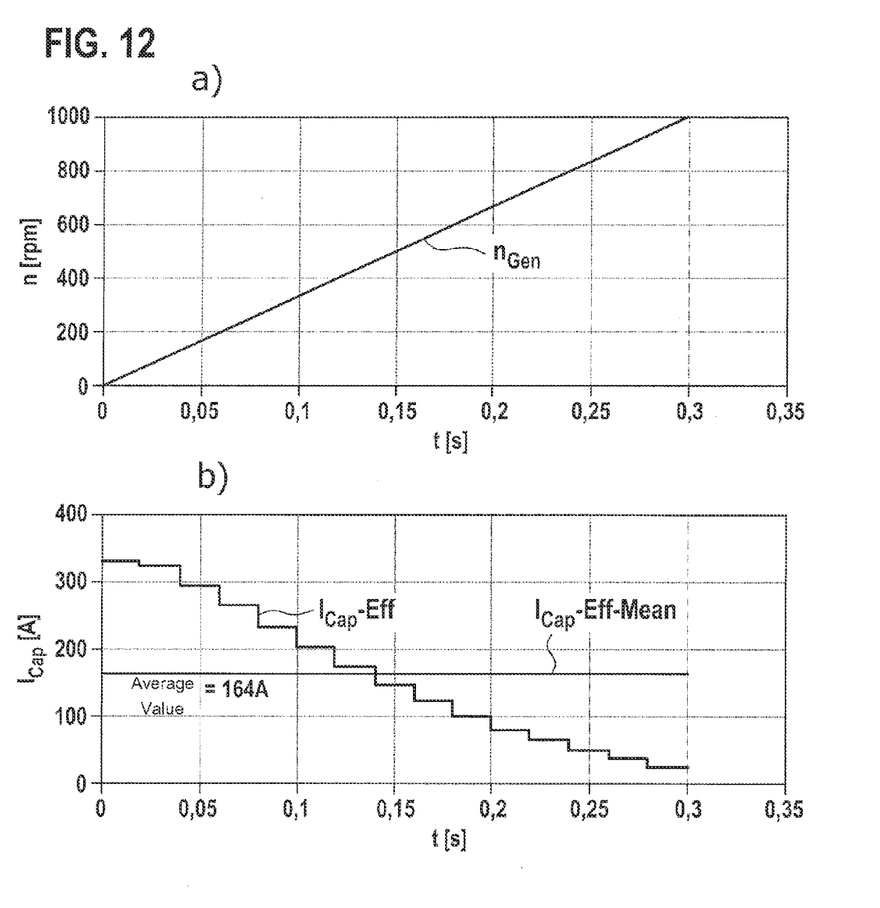
FIG. 12 shows diagrams for illustrating the DC link current in a speed run-up when a known center-aligned control pattern is used.

FIG. 12 illustrates a simulation of a speed run-up of an electric machine in the case of a known center-aligned control, this speed run-up taking place linearly from 0 rpm to 1000 rpm in 0.3 s. It is apparent that in this case an effective DC link current having an average value of 164 A results.

Figure 13:
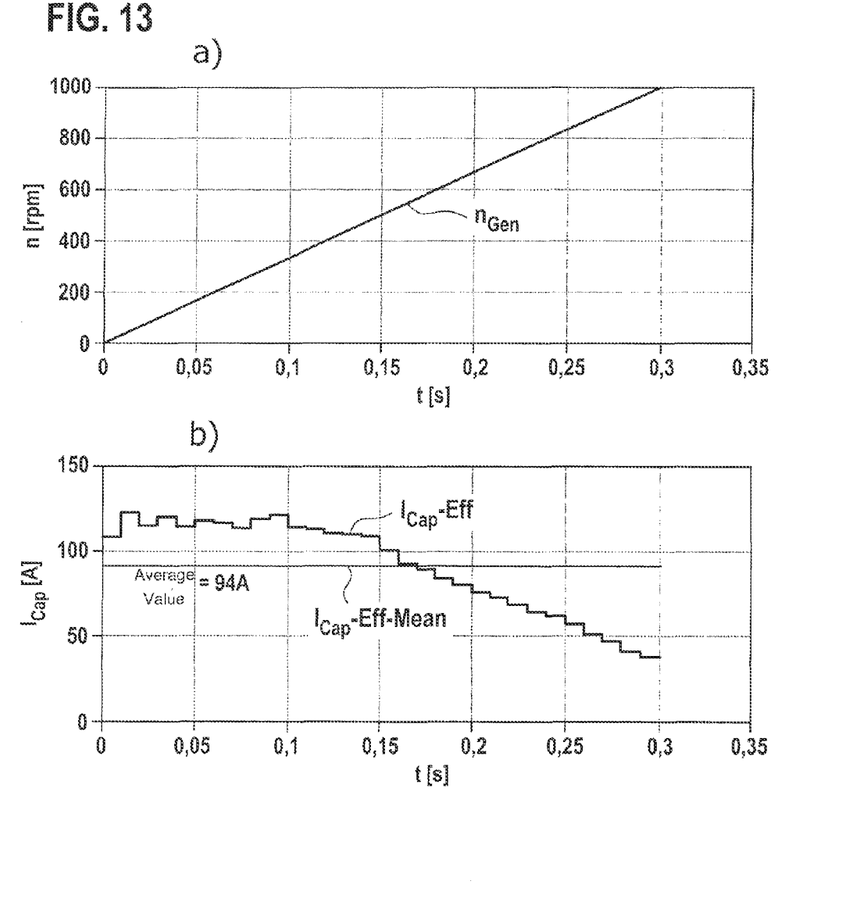
FIG. 13 shows diagrams for illustrating the DC link current in a speed run-up when a control pattern according to the present invention is used.

FIG. 13 illustrates a simulation of a speed run-up of an electric machine in the case of a control strategy according to the present invention, here as well the speed run-up taking place linearly from 0 rpm to 1000 rpm in 0.3 s. It is apparent that an effective DC link current having an average value of 94 A, i.e., significantly reduced, results when a control pattern according to the present invention is used.

For electric machines having a phase number greater than 5, there is a larger number of pulse patterns according to the present invention which result in reduced DC link currents. These pulse patterns are ascertained in advance and permanently stored in the sequence control of the particular system.

The generator current is controlled via a gradation with the aid of the individual pulse patterns, the excitation current of the machine, the commutation angle, a pulsed battery current at a higher time level with buffering in the battery, or via a combination of these measures.

A method for controlling a multiphase machine according to the present invention is advantageously suitable for reducing the effective DC link current in particular in a step-up converter operation, but may also be used in the engine mode of the machine. The switching pulses of the switches associated with the phases may be easily computed from the instantaneous rotational speed, and independently of the instantaneous phase position. A method according to the present invention is usable in machines having any arbitrary phase number, but in particular in machines having a phase number greater than 3.

What is claimed is:

1. A method for controlling a multiphase machine connected to a battery, the multiphase machine having a DC link provided with a DC link capacitor, phase windings, and a high side switch and a low side switch for each phase, the switches associated with the individual phases being acted on by control signals from a control unit, the method comprising:
    causing the control unit to provide the control signals for the switches associated with the individual phases in such a way that:
        sinusoidal phase currents are predefined,
        at least one phase current is connected at any point in time in each control cycle,
        a fixed, pulsed control pattern is present for each control cycle, control widths of actuating signals associated with the phases being constant in the pulsed control pattern, and
        control pulses associated with the individual phases are predefined in such a way that no time gaps between the control pulses occur and a DC link current which arises is minimized; and
    in order to set the minimum DC link current, varying at least one of positions of the control pulses within a control interval, an amplitude of a setpoint voltage, and a width of the individual control pulses by an offset of control durations.

2. The method as recited in claim 1, wherein a control cycle corresponds to an angular range of 360°/(2·PZ), where PZ is the number of phases of the multiphase machine.

3. The method as recited in claim 1, wherein a flattop method is used within a control cycle.

4. The method as recited in claim 1, wherein a control frequency of the switches associated with the phases is tracked in such a way that an integer number of pulse patterns is provided in an angular range of 360°/(2·PZ).

5. A method for controlling a multiphase machine connected to a battery, the multiphase machine having a DC link provided with a DC link capacitor, phase windings, and a high side switch and a low side switch for each phase, the switches associated with the individual phases being acted on by control signals from a control unit, the method comprising:
    causing the control unit to provide the control signals for the switches associated with the individual phases in such a way that:
        sinusoidal phase currents are predefined,
        at least one phase current is connected at any point in time in each control cycle,
        a fixed, pulsed control pattern is present for each control cycle, control widths of actuating signals associated with the phases being constant in the pulsed control pattern, and
        control pulses associated with the individual phases are predefined in such a way that a DC link current which arises is minimized; and
    in order to set the minimum DC link current, varying at least one of positions of the control pulses within a control interval, an amplitude of a setpoint voltage, and a width of the individual control pulses by an offset of control durations;
    wherein the control widths of the actuating signals associated with the phases are ascertained based on the particular instantaneous voltage phasor.

6. A method for controlling a multiphase machine connected to a battery, the multiphase machine having a DC link provided with a DC link capacitor, phase windings, and a high side switch and a low side switch for each phase, the switches associated with the individual phases being acted on by control signals from a control unit, the method comprising:
    causing the control unit to provide the control signals for the switches associated with the individual phases in such a way that:
        sinusoidal phase currents are predefined,
        at least one phase current is connected at any point in time in each control cycle,
        a fixed, pulsed control pattern is present for each control cycle, control widths of actuating signals associated with the phases being constant in the pulsed control pattern, and
        control pulses associated with the individual phases are predefined in such a way that a DC link current which arises is minimized; and
    in order to set the minimum DC link current, varying at least one of positions of the control pulses within a control interval, an amplitude of a setpoint voltage, and a width of the individual control pulses by an offset of control durations;
    wherein a generator current is controlled via a gradation with the aid of one of the pulse patterns, an excitation current of the machine, a commutation angle, a pulsed battery current at a higher time level with buffering in the battery, and via a combination of at least two of the pulse patterns, the excitation current of the machine, the commutation angle, and the pulsed battery current at the higher time level with buffering in the battery.

* * * * *